3,203,068
HOSE CLAMPS
Erik Bergström, Djursholm, Sweden, assignor to Allmanna Brandredskapsaffaren AB, Stockholm, Sweden, a corporation of Sweden
Filed Mar. 1, 1961, Ser. No. 92,513
6 Claims. (Cl. 24—274)

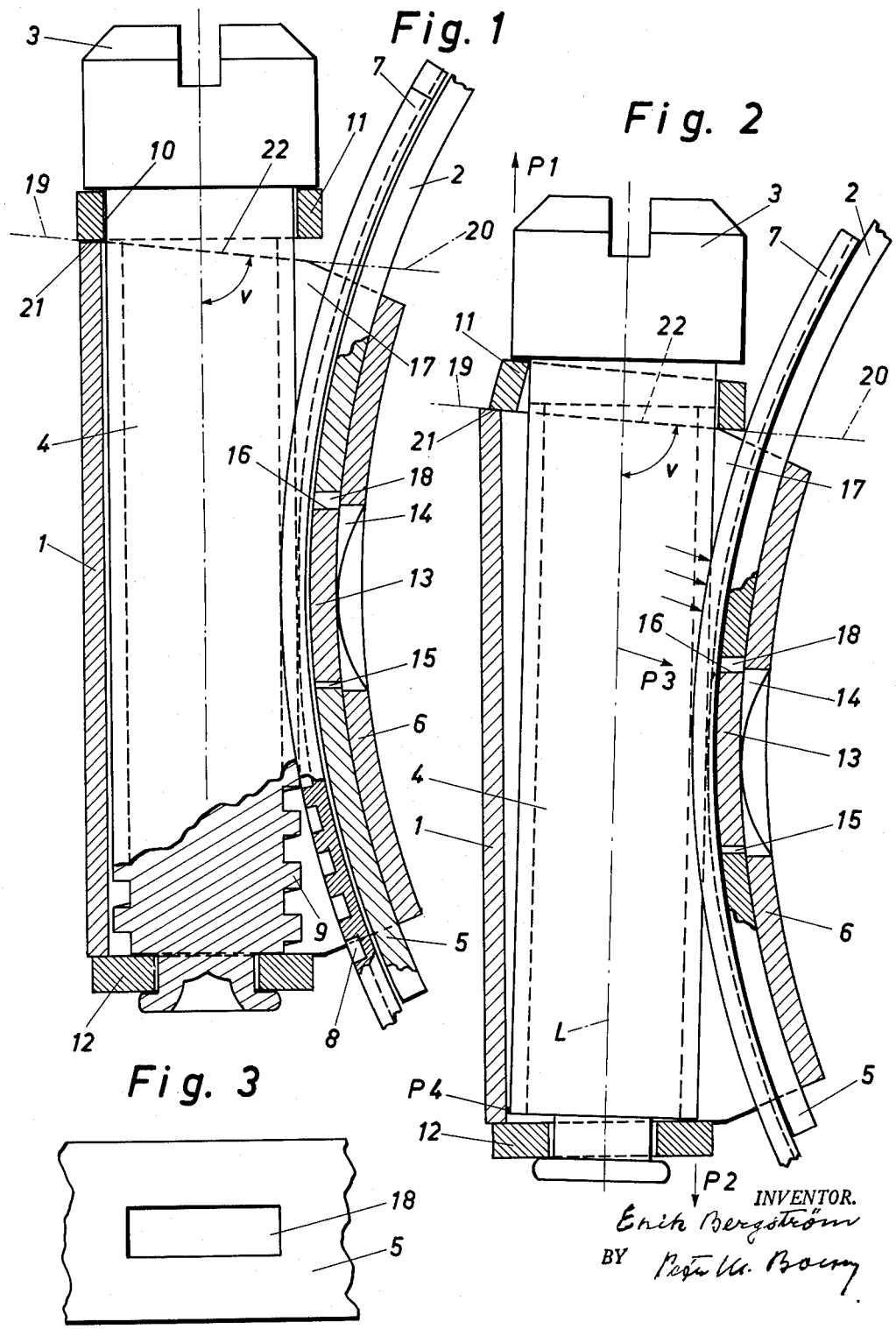

The present invention has reference to a device in hose clamps of the type comprising an annularly bent steel band having its ends overlapping one another, the radially outer end portion being on its outer surface provided with transversely extending threads for engagement with the threads of a screw provided with a head and being rotatably journalled but axially relatively fixed in a housing which encloses the screw and the radially inner band end which is to be arranged at the bottom of the housing, said housing also having a space of such dimensions as to render possible a movement of the outer band end between the inner band end and the screw by a rotation of the latter. According to a preferred embodiment, the housing is composed of a seamless tube. The radially inner steel band end is attached to the bottom of the housing in such a way that it cannot be moved relatively to the same. As an example, there is pressed upward from the bottom of the housing an oblong shoulder with free end surfaces, the side parts of the shoulder being connected with the bottom of the housing. Said shoulder fits into a corresponding notch in the inner end portion of the steel band. Upon tightening of the screw and thus of the band the tension in a cross section through the inner end portion of said band in front of the shoulder in the bottom of the housing increases. It has been found that this tension often causes breaks in the inner end portions of said cross section before the tension stress in the rest of the band has reached its top limit. The durability of the hose clamp has thus hitherto been controlled primarily by the dimensions of said cross section. Also the durability has to some extent been dependent on the value of the surface pressure caused by the tightening of the screw between one end edge of the notch in the inner end portion of the band and the corresponding end surface on the shoulder. This surface pressure must of course not exceed the yield point of the material used. These cooperating constituents determine the durability of the hose clamp.

The object of the present invention is to increase the tensile strength of a hose clamp by simple means. According to the invention this is obtained by an increase of the friction force between on one hand the two end portions of the steel band and on the other hand between the inner end portion and the bottom of the housing. According to the invention, this increased friction force is obtained in such a manner that the end of the housing located remotely from the screw head has an axial projection at the part of said housing situated furthest from the bottom of the housing. This projection forms upon tightening of the screw a pivot support for the screw head which cooperates with a washer positioned between said head and the housing end is constructed in such a way that the screw with its head is swung closer to the bottom of the housing while the opposite end of the screw essentially remains in its original position. This swinging movement of the screw has as a result on one hand that the threads on the screw effectively engage the threads in the outer end portion of the steel band and on the other hand that this end portion is pressed effectively against the inner end portion and further that the inner end portion is effectively pressed against the bottom of the housing. Due to this increased friction the loads on the shoulder in the bottom of the housing and on the inner band end at the cross section through the notch in said band are decreased.

According to a preferred embodiment of the new hose clamp, the end plane of the housing facing the screw head subtends an acute angle with the longitudinal axis of the housing in such a way that the end in question of the housing at its part remote from the bottom thereof extends axially beyond the part thereof closest to the bottom. The angle should have a value of 78–88°, preferably 83–87°, i.e. it deviates with 2–12°, preferably with 3–7°, from the right angle and the end plane thereby inclines inwards against the housing bottom.

The invention will now be elucidated with reference to the accompanying drawings. In the drawings:

FIG. 1 is a vertical longitudinal section through a hose clamp according to the invention and showing the screw before the tightening, FIG. 2 is a corresponding longitudinal section showing the screw after the tightening, and FIG. 3 shows on a somewhat reduced scale the inner end portion of the steel band with its notch.

According to the drawings, the hose clamp comprises a housing 1, a steel band 2, and a screw 4 with a head 3. The band 2 is bent to annular shape. Its radially inner end portion 5 is attached to the bottom 6 of the housing 1 and its radially outer end portion 7 is on the outer side thereof provided with transversely extending threads 8 meshing with the threads 9 of the screw 4. There is an annular space 10 between the head 3 and the adjacent end of the housing 1 and a washer 11 is positioned in this space 10. An end washer 12 is riveted to the end of the screw remote from the head in such a way that the screw 4 can be rotated and also brought somewhat closer to the band 2 but is axially nondisplaceably journalled in the housing 1. The bottom 6 has an oblong shoulder 13 extending up into the housing, and the side portions 14 of said shoulder 13 are connected with the bottom. The end surfaces 15, 16 of the shoulder extend freely into the space 17 between the screw 4 and the bottom 6. The inner end portion of the end 2 has a notch 18 of such dimensions that the shoulder 13 can be brought to engage the same.

The end plane 19–20 of the housing facing the screw head 3 is inclined somewhat inwards in the direction towards the bottom 6. It forms an angle $v$ which has a value of 78–88°, preferably 83–87°. The portion 21 at the part of the housing remote from the bottom 6 extends axially somewhat beyond the portion 22 of the housing end in question situated close to the bottom 6.

Upon tightening of the screw 4, the outer band end 7 is drawn to the right according to the drawing and into the space 17 of the housing 1. Upon tightening, the washer 11 is pressed against the axial projection 21. The screw is then swung due to the occurring axial forces denoted with the arrows P1 and P2 in a vertical plane indicated by the arrow P3 in such a way that the head 3 approaches the bottom 6. Upon this swinging movement the screw 4 is first swung to rest with its end remote from the head 3 against the housing 1 at the point P4 and thereupon this point serves as a pivot axis during the continued tightening. The harder the tightening is, the more the screw will be inclined. As a result of this, the outer band end 7 will be pressed tightly against the inner band end 5 and the latter will be pressed tightly against the bottom 6. Thereby a high frictional force is obtained. It is evident that due to this frictional force the stresses against the shoulder 13 and on the weakest cross section through the inner band end 5 in front of the notch 18 are thereby considerably reduced.

Upon tightening, the washer 11 is somewhat compressed in front of the projection 21 in such a way that the washer 11 thereby better fits the end plane 19–20.

As is obvious from FIG. 2, after such a deformation there is obtained to some extent a double action of the washer 11 which further increases the pressing of the screw. By the edgewise arranging of the deformed portion of the washer 11 (see the upper left hand portion of FIG. 2) a great part of the axial force P1 is transformed to a force which presses the screw 4 with the head portion thereof closer to the band 2.

The present invention has been described in detail above for purposes of illustration only and is not intended to be limited by this description or otherwise except as defined in the appended claims. Said claims also include a type of hose clamp in which the inner steel band end is attached to the bottom 6 by means of spot welding or in any other way. The washer 11 may eventually be dispensed with and in such a case the head 3 rests against the end portion 21 of the housing.

What I claim is:

1. A hose clamp comprising, in combination,
   (a) an annularly bent steel band having inner and outer end portions overlapping each other,
   (b) there being transverse threads on the outer end portion of said steel band,
   (c) a screw having a threaded portion and a head on said threaded portion forming an annular shoulder, the face of the head of said screw being directed toward the housing substantially perpendicular to the axis of said screw, the threaded circumferential outer surface of said screw engaging the band only over a relatively short arc, the portion of the screw located near the head thereof being located at a distance from the threaded outer surface of the band,
   (d) a housing having a bottom portion enclosing and fixed to the inner end portion of said band, said screw being journaled within said housing to be axially immoveable, said housing containing a space within which said outer end portion of said steel band passes between the threaded portion of said screw and the inner end portion of said steel band, the threaded portion of said screw engaging said transverse threads, and
   (e) an axial projection extending from the side of said housing disposed away from said steel band and engageable with the annular shoulder of said screw, said axial projection and said threads exerting a torque on said screw when said screw is tightened, said threaded portion of said screw having an end engageable with the annular shoulder of said screw, so that the torque on said screw forces said threaded portion of said screw towards said band.

2. The combination according to claim 1 with the addition of a washer disposed between the annular shoulder of said screw and said axial projection, said washer engaging said axial projection and exerting a force on the annular shoulder of said screw is tightened.

3. The combination according to claim 1 wherein said housing has an end disposed beneath the head of said screw and wherein said axial projection is formed by said end of said housing disposed beneath the head of said screw, said end of said housing being formed at an acute angle with the longitudinal axis of said housing, the portion of said end of said housing first engaging the annular shoulder of said screw being disposed away from said steel band.

4. The combination according to claim 3 wherein said end of said housing is formed at an angle from 78 to 88 degrees with the axis of said housing.

5. The combination according to claim 3 wherein said end of said housing is formed at an angle of 83 to 87 degrees with the axis of said housing.

6. A hose clamp comprising, in combination,
   (a) an annularly bent steel band having inner and outer end portions overlapping each other, said inner end portion containing an aperture,
   (b) there being transverse threads on the outer end portion of said steel band,
   (c) a screw having a threaded portion and a head on said threaded portion, the face of the head of said screw being directed toward the housing and providing an annular shoulder which is substantially perpendicular to the axis of said screw,
   (d) a housing having a bottom portion with a boss pressed inwards from said bottom portion, said boss extending into said aperture in said inner end portion of said steel band fixing said steel band to said housing, said screw being journaled within said housing to be axially immovable, said housing containing a space within which said outer end portion of said steel band passes between the threaded portion of said screw and the inner end portion of said steel band, the threaded portion of said screw engaging said transverse threads,
   (e) an end portion of said housing being formed at an angle of 83 to 87 degrees with the longitudinal axis of said housing, the portion of said end of said housing disposed away from said steel band projecting furthest from said housing, and
   (f) a washer disposed about said screw beneath said annular shoulder contacting said end portion of said housing, said end portion of said housing through said washer and said transverse threads exerting a torque on said screw when said screw is tightened, said threaded portion of said screw having an end engaging said housing which is laterally restrained so that the torque on said screw forces said threaded portion of said screw towards said steel band so as to at least partially clamp the inner end of said steel band on the side of said aperture in said inner end disposed away from said inner end.

References Cited by the Examiner

UNITED STATES PATENTS

| | | | |
|---|---|---|---|
| 2,487,296 | 11/49 | Bergstrom | 24—274 |
| 2,650,405 | 9/53 | Cheney | 24—274 |
| 2,910,758 | 11/59 | Arthur | 24—274 |
| 2,944,314 | 7/60 | Black | 24—274 X |

WILLIAM FELDMAN, *Primary Examiner.*

SAMUEL KOREN, ABRAHAM G. STONE, DONLEY J. STOCKING, *Examiners.*